United States Patent
Lee et al.

(10) Patent No.: US 12,321,684 B2
(45) Date of Patent: Jun. 3, 2025

(54) SCREEN DISPLAY METHOD OF ELECTRONIC DEVICE

(71) Applicant: Samsung Electronics Co., Ltd., Gyeonggi-do (KR)

(72) Inventors: Seonho Lee, Gyeonggi-do (KR); Hyerim Bae, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 18/201,916

(22) Filed: May 25, 2023

(65) Prior Publication Data

US 2023/0297762 A1    Sep. 21, 2023

Related U.S. Application Data

(63) Continuation of application No. PCT/KR2023/001322, filed on Jan. 30, 2023.

(30) Foreign Application Priority Data

Mar. 2, 2022  (KR) .................. 10-2022-0026740
Apr. 13, 2022  (KR) .................. 10-2022-0045757

(51) Int. Cl.
*G06F 40/14* (2020.01)
*G06F 40/106* (2020.01)

(52) U.S. Cl.
CPC ............ *G06F 40/106* (2020.01); *G06F 40/14* (2020.01)

(58) Field of Classification Search
CPC ... G06F 3/048–05; G06F 40/106; G06F 40/14
See application file for complete search history.

(56) References Cited

U.S. PATENT DOCUMENTS 6,300,947 B1    10/2001    Kanevsky
7,219,309 B2    5/2007    Kaasila et al.
(Continued)

FOREIGN PATENT DOCUMENTS

KR    10-2011-0129797 A    12/2011
KR    10-1198231 B1    11/2012
(Continued)

OTHER PUBLICATIONS

English Translation of KR 20160044400 A published on Apr. 25, 2016 (Year: 2016).*

(Continued)

*Primary Examiner* — Daniel Rodriguez
(74) *Attorney, Agent, or Firm* — Cha & Reiter, LLC

(57) ABSTRACT

An electronic device and method are disclosed. The device includes a memory and a processor. The memory stores instructions executable by the processor to implement the method, including: upon detecting a request to execute an application, load a page of the application, based on a display specification of the electronic device, determine whether to adjust a layout of a screen including output of the loaded page, upon adjusting the layout of the screen, determine an additional content to be displayed in an extra space included in the adjusted layout of the screen, and determine an output method by which the determined additional content is displayed in the extra space.

19 Claims, 19 Drawing Sheets

(56) References Cited

U.S. PATENT DOCUMENTS

| | | | | |
|---|---|---|---|---|
| 7,685,273 | B1* | 3/2010 | Anastas | H04L 12/6418 |
| | | | | 709/224 |
| 8,225,197 | B1* | 7/2012 | Szewczyk | G06F 9/451 |
| | | | | 715/241 |
| 11,079,995 | B1* | 8/2021 | Hulbert | G06F 3/04815 |
| 2010/0318507 | A1* | 12/2010 | Grant | G06Q 30/0269 |
| | | | | 707/706 |
| 2013/0176248 | A1* | 7/2013 | Shin | G06F 3/041 |
| | | | | 345/173 |
| 2014/0015743 | A1* | 1/2014 | Seo | G06F 3/017 |
| | | | | 345/156 |
| 2014/0049464 | A1* | 2/2014 | Kwak | G06F 3/017 |
| | | | | 345/156 |
| 2014/0101535 | A1* | 4/2014 | Kim | G06F 3/04886 |
| | | | | 715/761 |
| 2016/0180813 | A1 | 6/2016 | Zhou et al. | |
| 2016/0284321 | A1* | 9/2016 | Cho | G06F 3/04817 |
| 2017/0357389 | A1* | 12/2017 | Fleizach | G06F 3/0485 |
| 2018/0018400 | A1* | 1/2018 | Cozzi | G06F 16/958 |
| 2018/0335908 | A1 | 11/2018 | Kim et al. | |
| 2022/0129037 | A1* | 4/2022 | Ito | G06F 1/3262 |
| 2024/0241625 | A1* | 7/2024 | Yang | G06F 1/1652 |

FOREIGN PATENT DOCUMENTS

| | | | | |
|---|---|---|---|---|
| KR | 10-2016-0027778 | A | | 3/2016 |
| KR | 20160044400 | A * | 4/2016 | G06F 3/0488 |
| KR | 10-1667266 | B1 | | 10/2016 |
| KR | 10-2017-0006432 | A | | 1/2017 |
| KR | 10-1840270 | B1 | | 5/2018 |
| KR | 10-2021-0033784 | A | | 3/2021 |

OTHER PUBLICATIONS https://nine01223.tistory.com/284.
https://developer.mozilla.org/ko/docs/Web/CSS/CSS_Positioning/Understanding_z_index/Adding_z-index.

* cited by examiner

SCREEN DISPLAY METHOD OF ELECTRONIC DEVICE

CROSS-REFERENCE TO RELATED APPLICATIONS

This application is a continuation of International Application No. PCT/KR2023/001322 designating the United States, filed on Jan. 30, 2023, in the Korean Intellectual Property Receiving Office, which claims priority under 35 U.S.C. § 119 to Korean Patent Application No. 10-2022-0026740, filed on Mar. 2, 2022, and Korean Patent Application No. 10-2022-0045757, filed on Apr. 13, 2022, in the Korean Intellectual Property Office, the disclosures of which are incorporated by reference herein its entirety.

BACKGROUND

1. Technical Field

The disclosure relates to configuration of a display screens, and, more particularly, to changing display arrangements upon detecting a change in form factor of an electronic device including a display.

2. Description of Related Art

With the development of flexible displays and related technologies, electronic devices have increasingly taken on a diversity of form factors, such as foldable type devices. Devices that incorporate these new form factors are capable of display resolutions and aspect ratios that were not previously available.

SUMMARY

In order to accommodate usage of various screen ratios, a content provider may program content to dynamically respond to changes in a horizontal/vertical size of a display screen, using a responsive layout. The responsive layout may include, for example, processes for arranging a page in a first layout when the horizontal size of the screen is 400 or less, and arranging a page in a second layout when the horizontal size is 800 or less. The responsive layout may have difficulty providing an output of web pages that are optimized for many form factors.

In an embodiment of the present disclosure, a technology for efficiently utilizing a display screen having various ratios may be provided to prevent generation of an unused space on a display screen for outputting an execution screen of an application or prevent loss of a content from the execution screen of the application, as the electronic devices of various form factors are introduced.

An embodiment of the present disclosure may provide a technology for providing a customized user interface (UI) on a display screen of electronic devices of various form factors by adding a specific function to contents having the same or similar context.

According to an embodiment, a screen display method of an electronic device according to an embodiment, the method includes loading a page of an app requested to be executed, determining whether to adjust a layout of a screen for outputting the page, based on a display specification of the electronic device, determining an additional content to be displayed in an extra space generated based on the layout adjustment of the screen, and determining an output method of the determined additional content through the extra space.

According to an embodiment, an electronic device includes at least one processor configured to load a page of an app requested to be executed, determine whether to adjust a layout of a screen for outputting the page, based on a display specification of the electronic device, determine an additional content to be displayed in an extra space generated based on the layout adjustment of the screen, and determine an output method of the determined additional content through the extra space.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
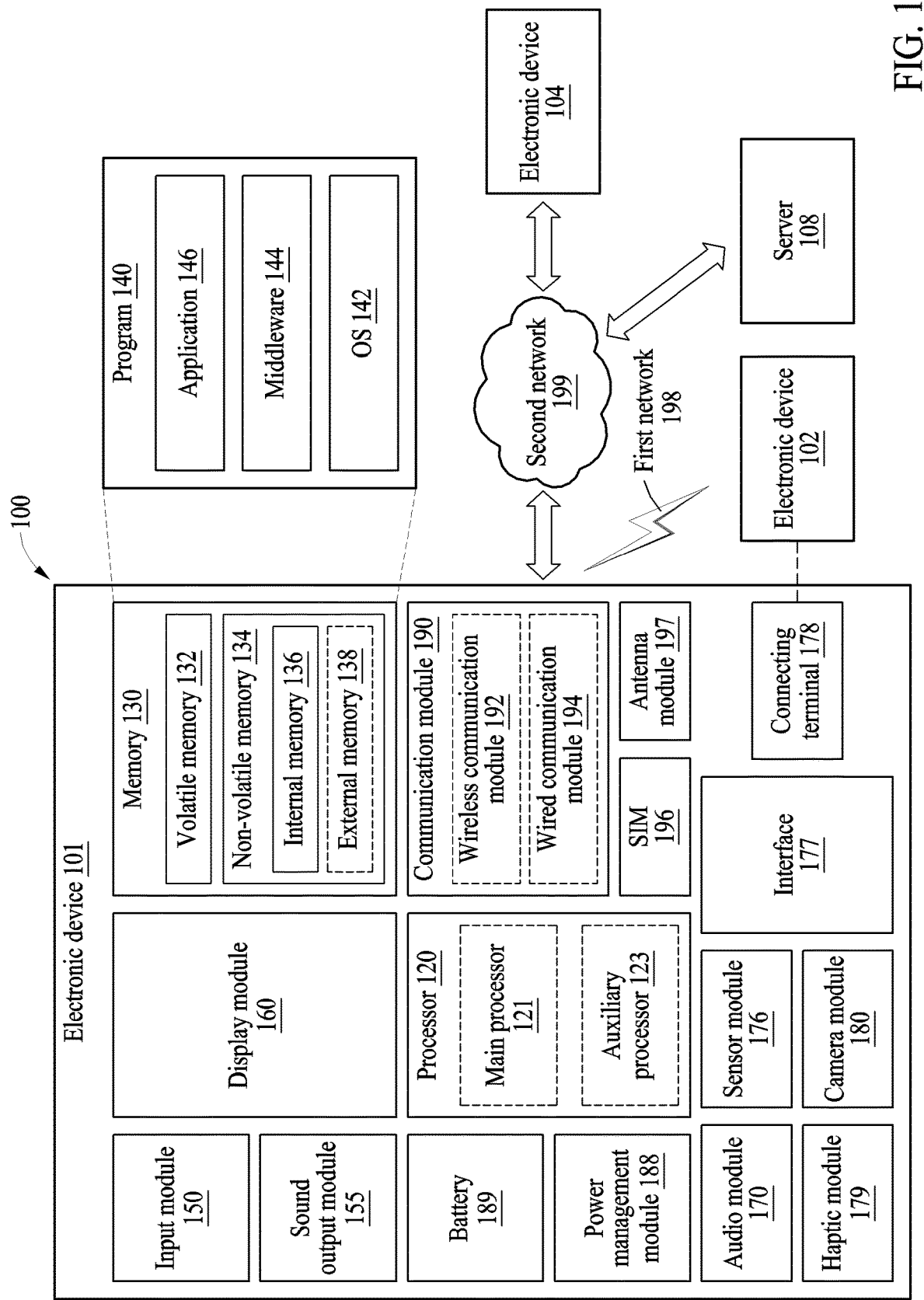
FIG. 1 is a block diagram illustrating an electronic device in a network environment according to an embodiment.

Hereinafter, certain embodiments will be described in detail with reference to the accompanying drawings. When describing certain embodiments with reference to the accompanying drawings, like reference numerals refer to like elements and a repeated description related thereto will be omitted.

FIG. 1 is a block diagram illustrating an electronic device in a network environment according to an embodiment.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated through machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electric signal and vice versa. According to an embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., a mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, cloud computing, distributed computing, mobile edge computing (MEC), or client-server computing technology may be used, for example. The electronic device 101 may provide ultra low-latency services using, e.g., distributed computing or MEC. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
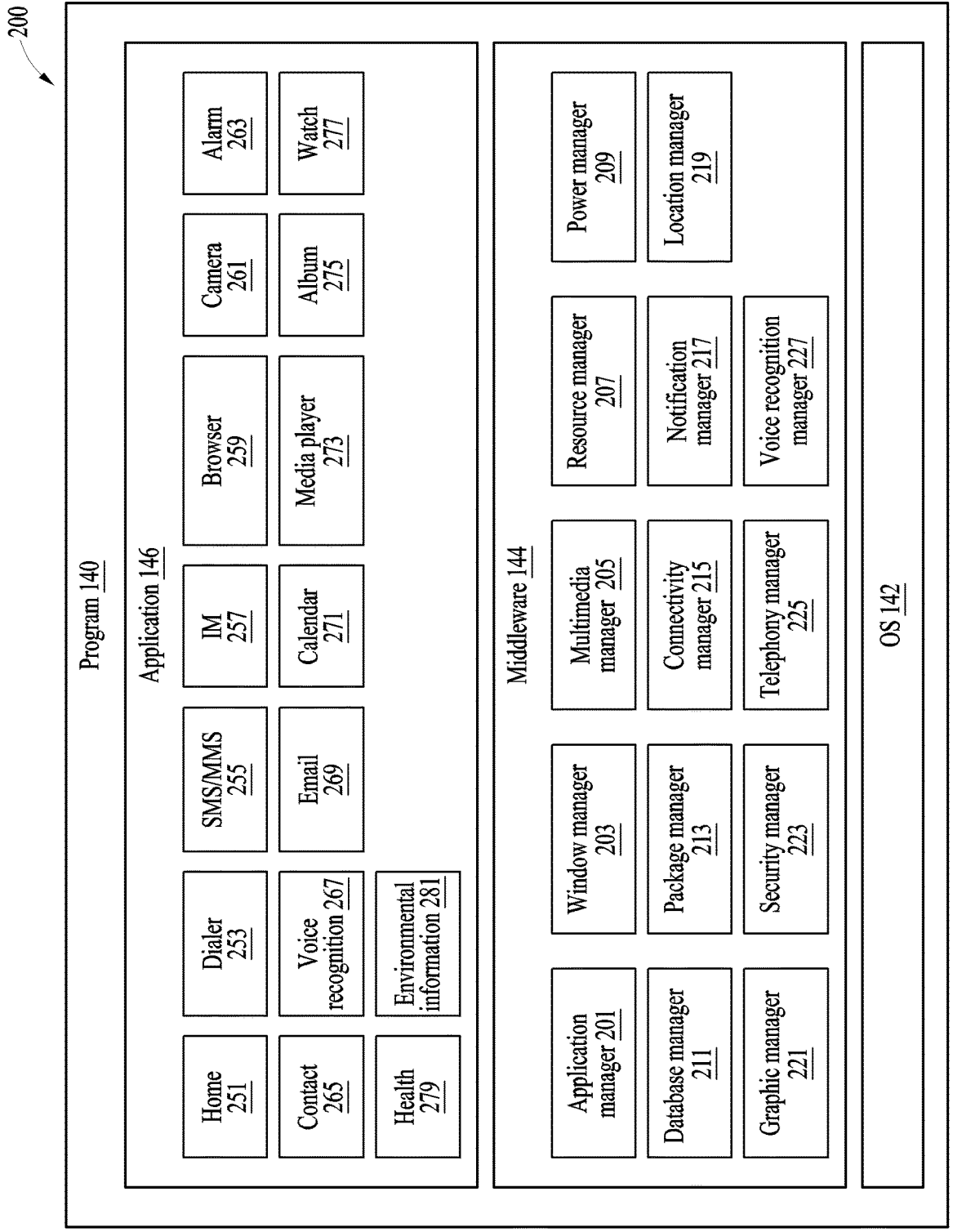
FIG. 2 is a block diagram illustrating a program of an electronic device according to an embodiment.

FIG. 2 is a block diagram illustrating a program of an electronic device according to an embodiment.

Referring to FIG. 2, the program 140 according to an embodiment may include an OS 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include other one or more driver programs to drive other hardware electronic devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database (DB) manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to an embodiment, the power manager 209 may interwork with a basic input/output system (BIOS) (not shown) of the electronic device 101.

The DB manager 211, for example, may generate, search, or change a DB to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit user's voice data to the server 108, and may receive, from the server 108, a command corresponding to a function to be executed on the electronic device 101 based on at least in part on the voice data, or text data converted based at least in part on the voice data. According to an embodiment, the middleware 144 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and an external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of an external electronic device that communicates with the electronic device 101, or some component (e.g., a display module or a camera module of the external electronic device) of the external electronic device. The device management application may additionally or alternatively support the installation, deletion, or update of an application being operated on an external electronic device.

Figure 3:
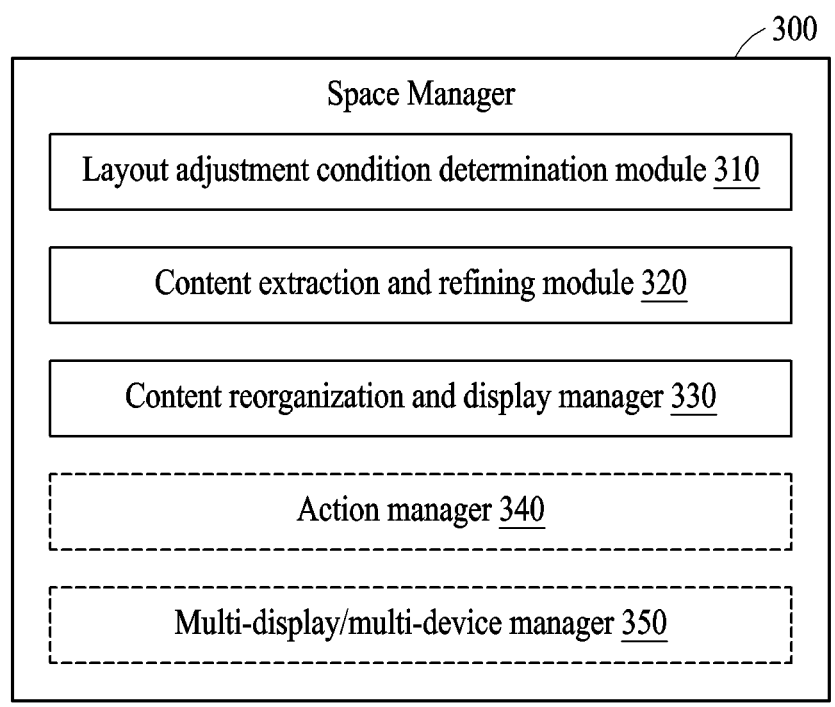
FIG. 3 is a block diagram of a space manager according to an embodiment.

FIG. 3 is a block diagram of a space manager according to an embodiment.

The space manager 300 according to an embodiment is software implemented to manage output of a page of an application (e.g., the application 146 of FIG. 1 or the application 146 of FIG. 2) requested to be executed on an electronic device (e.g., the electronic device 101 of FIG. 1) and may be included in middleware (e.g., the middleware 144 of FIG. 1 or the middleware 144 of FIG. 2) for providing various functions to the application 146. The space manager 300 may be executed by at least one processor (e.g., the processor 120 of FIG. 1) of the electronic device 101.

The space manager 300 according to an embodiment may include a layout adjustment condition determination module 310, a content extraction and refining module 320, and a content reorganization and display manager 330.

The layout adjustment condition determination module 310 according to an embodiment may determine whether to adjust a layout of a screen for output of a page of a loaded application (or app) based on display specification of the electronic device.

The electronic device according to an embodiment may receive an execution request for an installed app from a user, and may load a page of the app in response to the execution request of the app. The app is an application which provides a page including various contents such as text, images, and videos, and may include, for example, a web browser app, game app, and/or video streaming app. In an example, the app may include an app having a content, of which the authority is given to the space manager 300 to access.

According to an embodiment, the page of the app is a page corresponding to the execution request of the app, and a web browser app may include a web page corresponding to a web address requested to be executed.

The display specification according to certain embodiments may refer to display-related information (e.g., information regarding the display module 160 of FIG. 1) of the electronic device, and may include, for example, a size of the display screen, and/or the number of divided regions in the display screen. The number of divided regions in the display screen may refer to the number of regions capable of outputting app pages in the display screen. The size of the screen may include a ratio of a width to a height of the screen.

Figure 4A:
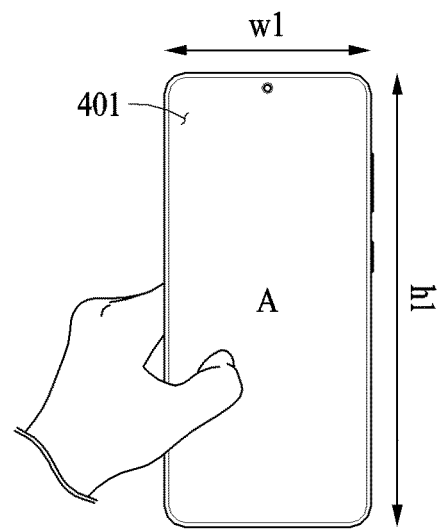
FIGS. 4A, 4B and 4C are diagrams illustrating a display specification determined based on a form factor structure of an electronic device according to an embodiment.
Figures 4B, 4C:
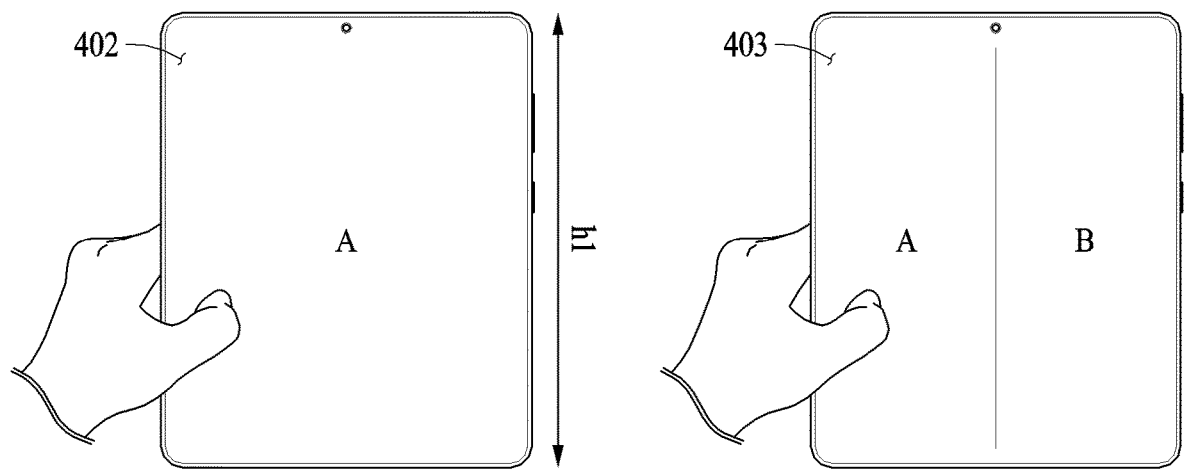

For example, the size of the screen and/or the number of divided regions may be determined based on a folded or unfolded state of the screen, according to the structure of the form factor of the electronic device. For example, referring to FIGS. 4A and 4B, when the form factor of the electronic device indicates a foldable structure including a display disposed on a front surface thereof, and a display disposed in a folded state. As such, a size (w1×h1) of a screen 401 in the folded state, as shown in FIG. 4A, may be different from a size (w2×h1) of a screen 402 in the unfolded state, as shown in FIG. 4B. In addition, in an example, referring to FIGS. 4A and 4C, when the form factor of the electronic device includes the foldable structure, the number of divided region A of the screen 401 in the folded state, as shown in FIG. 4A, may be one, and the number of divided regions A and B of the screen 403 in the unfolded state, as shown in FIG. 4C, may be changed to two. form factor may include various structures in which the shape of the screen is changed, such as a rollable or slidable structure, and the size of the display screen and/or the number of divided regions may be determined according to the state of the form factor structure.

Figure 5:
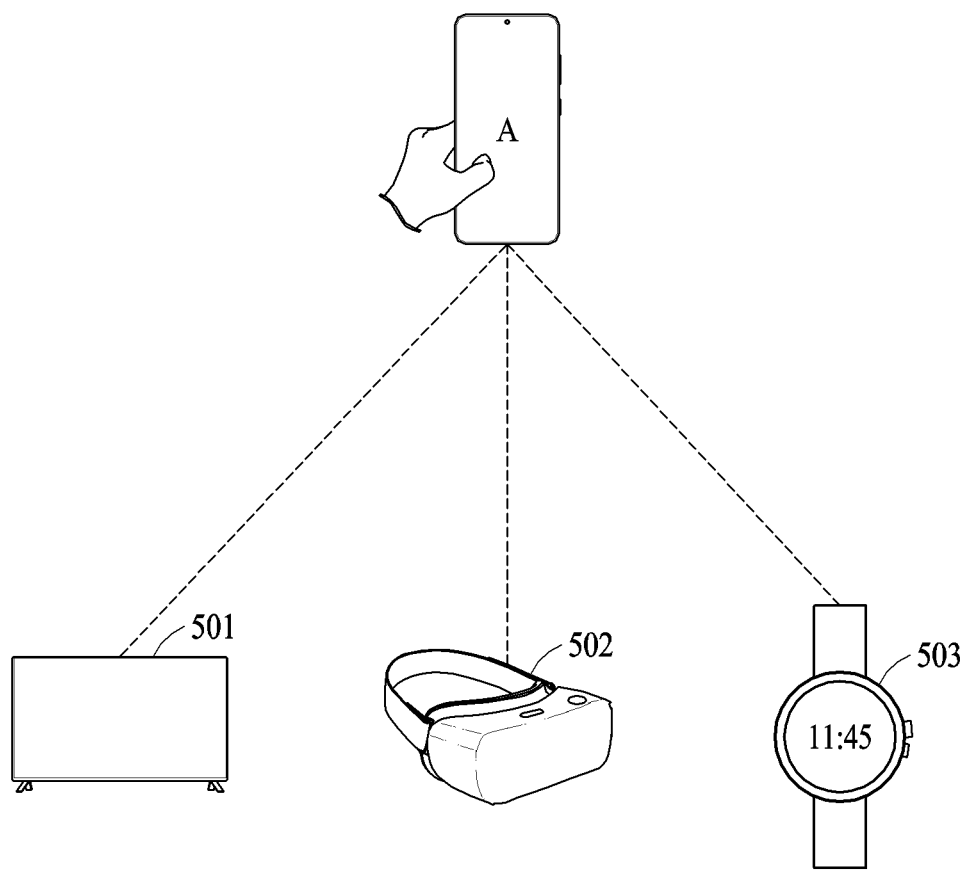
FIG. 5 is a diagram illustrating a display specification determined based on association of an electronic device with an external device according to an embodiment.

In another example, the size of the screen and/or the number of divided regions may be determined based on a linked state (e.g., pairing or other communicative connection) of the electronic device with an external device. For example, the electronic device may be linked with one or more external devices through a network connection such as Bluetooth pairing or a physical connection such as an HDMI output. When the electronic device is linked with one or more external devices including a display, the size of the screen and the number of divided regions may be determined based on display specification of the linked external device. For example, referring to FIG. 5, an external device may be linked with an electronic device 101, and may include a monitor 501, augmented reality (AR) glasses 502, and/or a smart watch 503. In an example, the display specification may include a size of a display screen included in the linked external devices 501, 502, and/or 503. In another example, when the external devices 501, 502, and/or 503 including at least one display are linked, the number of divided regions of the display screen of the electronic device may be considered as increasing by one.

In another example, when the user arbitrarily transforming the screen as divided windows or changes the size of the screen area, to which a display page is output, the display specification may be determined by reflecting not the size of the screen set by default according to a physical size of the display, but rather a size of the screen change by the user.

According to an embodiment, a determination may be made as to whether to adjust the layout of the screen for outputting the page of the app based on the display specification.

In an example, the layout adjustment condition may include a condition regarding a ratio of a width to a height of the screen. For example, when the ratio (width/height) of the width to the height of the screen according to the display specification satisfies $(1-x)<(\text{width/height})<(1+x)$, it may be determined to adjust the layout. Herein, x is an unknown number for reference setting, and may be set to a set value.

In another example, the layout adjustment condition may include a condition regarding the number of divided regions of the screen. For example, when the electronic device is linked with an external device including a display or when the screen expands according to the form factor structure and the number of divided regions of the screen is changed to two or more, it may be determined to adjust the layout.

According to an embodiment, the layout adjustment may include an operation of dividing the screen in a specific direction at a specific ratio.

Figure 6:
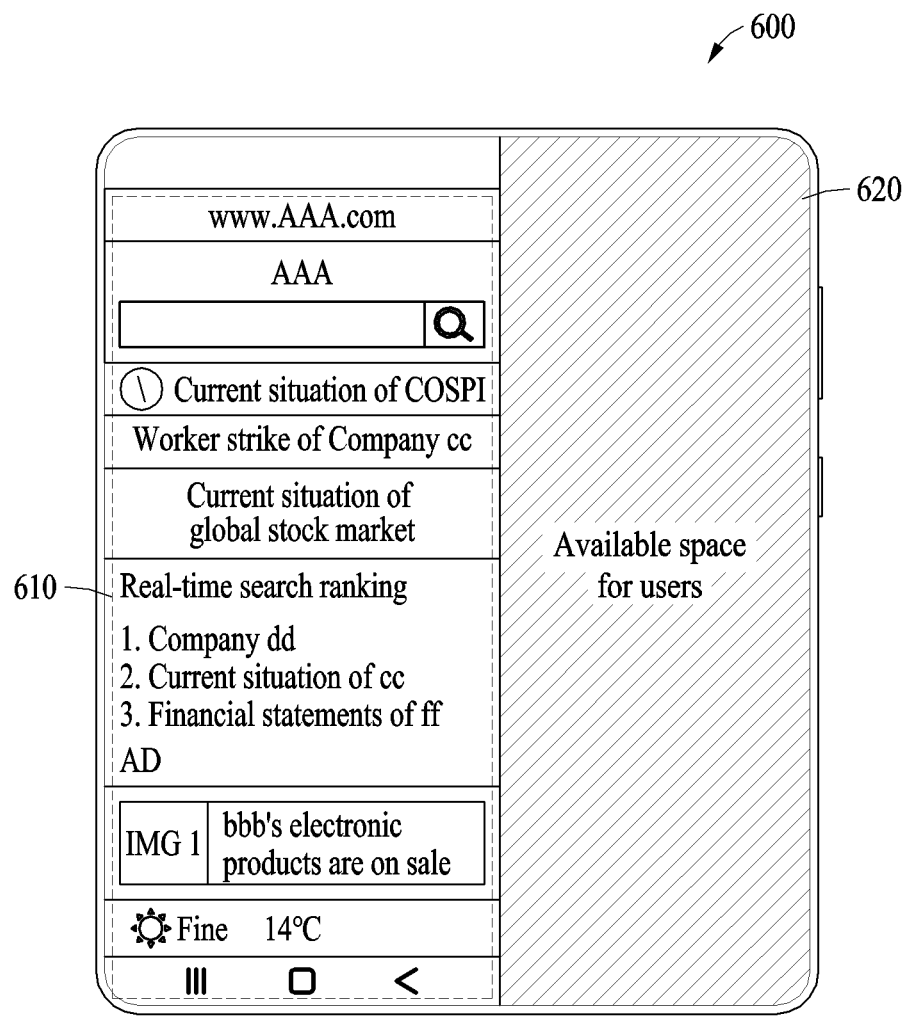
FIG. 6 is a diagram illustrating a main space and an extra space of a divided screen according to an embodiment.

For example, referring to FIG. 6, a screen 600 may represent a display page of an application. A user may have previously requested execution of the application, resulting in display of screen 600. Screen 600, as seen in FIG. 6, may be divided into a main space 610 and an extra space 620 by a layout adjustment. In this example, the sizes of the main space 610 and the extra space 620 may be determined based on a screen ratio corresponding to the output page of the app and/or a set dividing ratio. For example, a length of one of the width or height of the screen may be set as a reference, and a length of the other one may be calculated according to a ratio of width:height (e.g., 3:5, 9:16, and/or 9:18), which may be set in response to the page based on the reference. The lengths of the width and height determined in this way may be set as the size of the main space 610, and the remaining space of the screen may be determined as the extra space 620.

According to an embodiment, based on determining to adjust the layout of the screen, the screen 600 may be divided into the main space 610 and the extra space 620, and an original display page of the requested application (e.g., "app") may be arranged in the main space 610. The display page of the app may be arranged in and output to the main space 610, and an additional content, which will be described below, may be arranged in and output to the extra space 620.

For example, in the case where the form factor of the electronic device includes a foldable structure, if the state is changed to the unfolded state while the page is output through a front display in the folded state, a determination may be executed whether to adjust the layout of the display page, when a change in the display specification is detected. When it is determined to adjust the layout, based on, for example, a change to the unfolded state, the display screen may be divided into the main space 610 and the extra space 620. For example, the display screen in the unfolded state may be divided so as to have a main space having substantially a same size or substantially a same ratio as the size of the screen of the front display in the folded state, and additional space in the unfolded state excluding the main space 610 in the display screen may be set as the extra space 620. Accordingly, even when the state of the display has been switched from the folded state to the unfolded state, the overall layout of the app page as viewable by the user may be maintained with a degree of consistency, despite the layout adjustment.

Although not shown in FIG. 6, according to an embodiment, the layout adjustment may include an operation of allocating two or more divided regions of the screen as the main space or the extra space. For example, when the number of divided regions of the screen increases to more than one, a first region of the screen may be allocated as a main space and a second region may be allocated as an extra space. For example, when the number of divided regions of the screen exceeds two, all remaining regions other than the first region, which is allocated as the main space, may be allocated as the extra space. As described above, the original page of the app loaded by the execution request for the app may be arranged in the main space, and the additional content may be arranged in the extra space.

Referring back to FIG. 3, the content extraction and refining module 320 according to an embodiment may determine an additional content to be displayed in the extra space (e.g., the extra space 620 of FIG. 6) generated based on the layout adjustment of the screen.

According to an embodiment, when objects including hyperlinks or media (e.g., images and/or videos) having the same or similar context in the original page of the loaded app are found, the objects may be determined as the additional content.

According to an embodiment, the additional content may be determined based on a document object model (DOM) structure of the page. For example, among the objects included in the page, objects including hyperlinks in the form of a uniform resource locator (URL) with the similar format according to the DOM structure or objects displayed in the form of a list or carousel on the same level according to the DOM structure may be determined as the additional content.

Figure 7A:
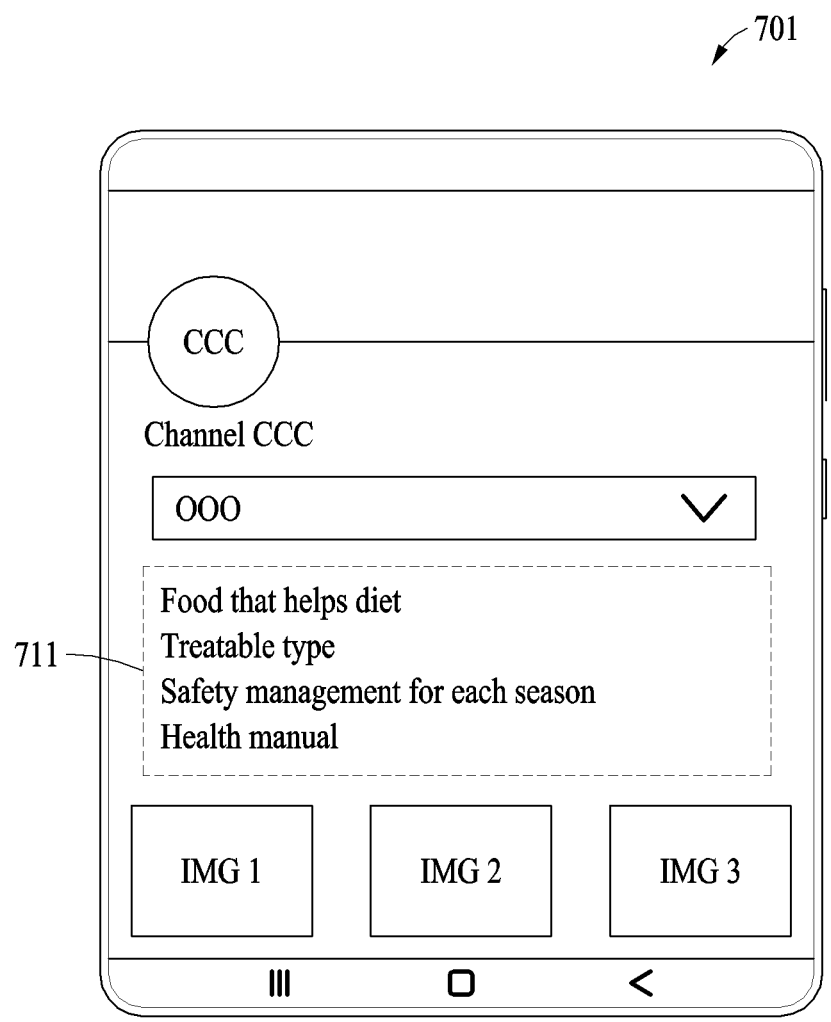
FIGS. 7A, 7B and 7C are diagrams illustrating an operation of determining an additional content according to an embodiment.
Figure 8:
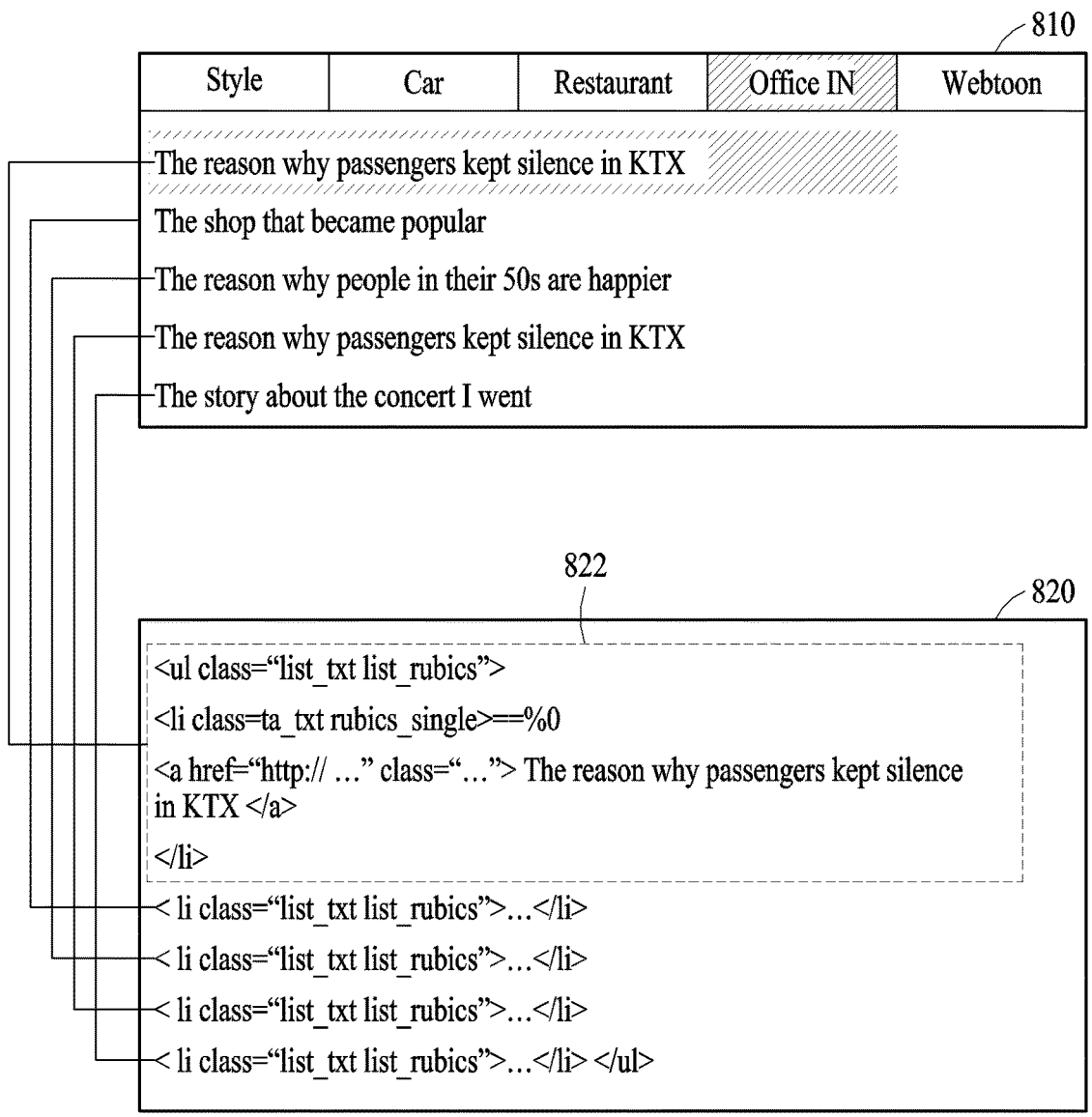
FIG. 8 is a diagram illustrating an operation of determining an additional content based on a document object model (DOM) structure of a web page according to an embodiment.

For example, referring to FIG. 7A, based on the DOM structure of an original page 701 of the loaded app, objects 711 within the page 701 may be extracted, including hyperlinks in the form of a URL links with similar formatting, and may then be arranged in the form of a list displayed within the same level. The extracted objects 711 may be determined as the additional content corresponding to the original page 701 of the loaded app. Referring to FIG. 8, in an example extraction method, a DOM 820 corresponding to objects 810 in a web page may show that a list item 822 of an <li> tag is located below a <ul> tag, and each list item 822 of the <li> tag includes a hyperlink and text description with an <a> tag in the <li> tag. Since the list items 822 of the <li> tag below the <ul> tag include the hyperlinks in the form of a URL links with similar formats on a same level, the objects 810 corresponding to the list items 822 of the <li> tag may be extracted as objects, which may then be arranged in the form of a list on a same level.

For example, even in a case of a page of an app other than the web page, since a general app has a layout configuration having a tree-type hierarchical structure, it may be determined whether the page includes objects arranged in a row on the same level to determine the additional content.

Figure 7B:
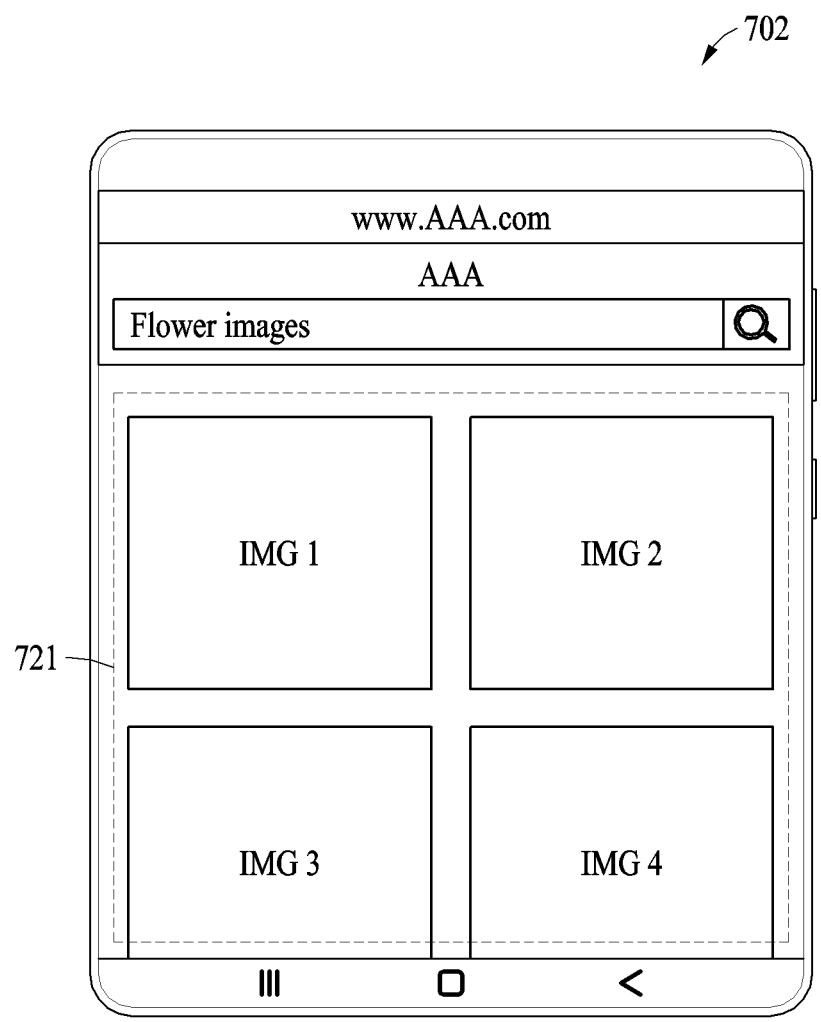

In another example, referring to FIG. 7B, based on a DOM structure of an original page 702 of the loaded app, objects 721 corresponding to content of the same image type may be extracted as objects, so as to be arranged in a row on a same level with a same width. The extracted objects 721 may be determined as the additional content corresponding to the original page 702 of the loaded app. For example, when the objects have the similar media size and/or similarly structure satisfying a specific size (and/or more or other conditions), the objects may be determined to be the additional content for display to the extra space.

Referring again to FIG. 7B, based on the DOM structure of the original page 702 of the loaded app, the objects 721 correspond to content of the same image type, and within the original page 702, are arranged in a row on a same level with a same width. Accordingly, the objects 721 may be determined as the additional content corresponding to the original page 702 of the loaded app, and selected for display in the extra space.

According to an embodiment, an interfacing object (i.e., interface object) operable according to a user interaction as included within a page may be determined as the additional content. The interfacing object operating may be configured so as to request execution of an operation when selected by a user. It may include objects configured to receive selections and/or inputs of the user, such as for example, a check box, a radio box, a button, a link, and/or a text input box. When the original page of the loaded app includes the interfacing object that is operative according to user interaction, the interfacing object may be determined as the additional content.

Figure 7C:
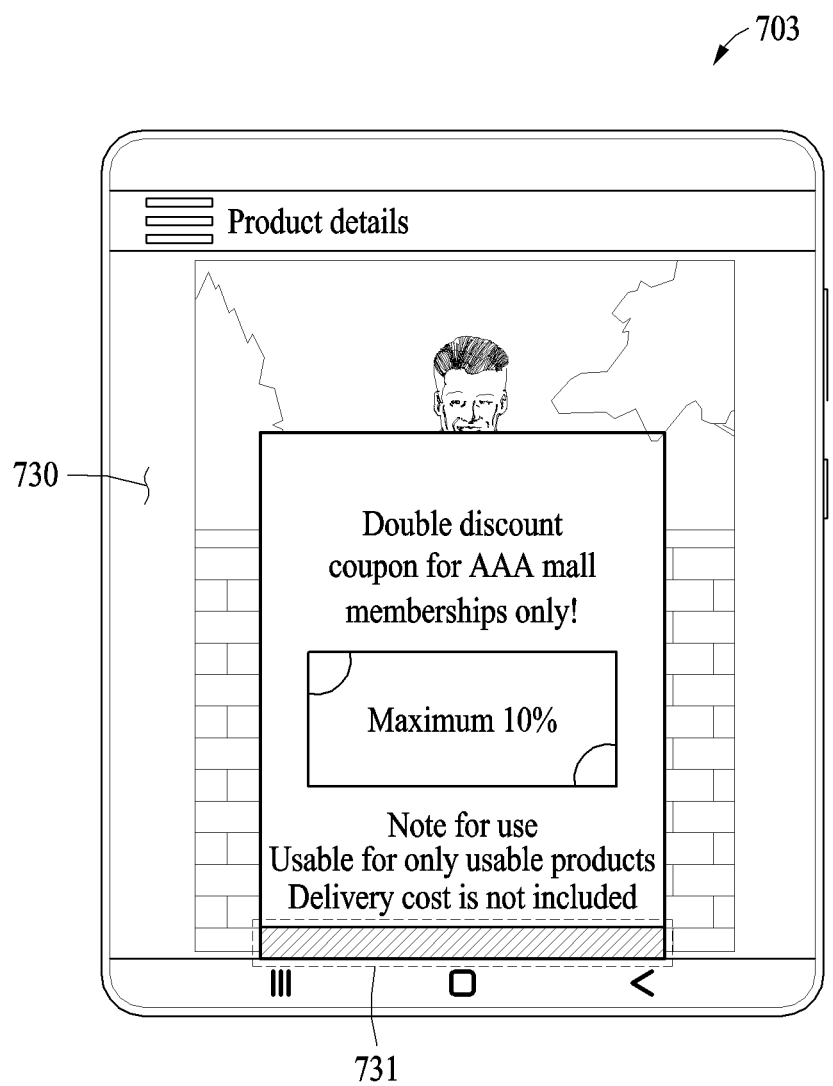

Another possible candidate for the additional content may be "lost" portions of displayed pages. Sometimes, a portion of a page is not displayed on the screen due to a difference between a screen ratio of a display and a ratio of sizes of objects set to for the output of the page. For example, referring to FIG. 7C, an interfacing object may include a "close" button 731. The close button 731 is configured such that when a user selects (e.g., clicks) on the close button, a corresponding pop-up window 730 will be removed from display. As seen in FIG. 7C, the close button 731 is not displayed fully because it is moved off-screen. In such a case, the close button 731 may be considered "lost" (as defined within this application). When the close button 731 is lost, an input, a user may not be able to select the close button 731, or selections may be inoperative, and thus a desired close operation may fail to be executed. Accordingly, the close button 731 may be determined as the additional content for display to the extra space.

When the close button 731 is lost, it may be determined that a lost interfacing object exists, when at least one of the following conditions is satisfied, as an example of a method of determining whether the interfacing object is lost on a UI displayed through a DIV tag such as the user pop-up window 730. The conditions include whether at least one or more images or texts exist in the DIV tag, whether at least one or more interfacing objects exist, whether a z-index value among attributes of a Cascading Style Sheets (CSS) style of the DIV tag is 1 or more and a DIV tag with a z-index value greater than a z-index value of a main page exists, whether an image or a text enclosed by an anchor tag is out of a screen, when a size of a width or height of an object is manually designated or relative coordinates are manually designated, and/or whether an image or a text enclosed by an anchor tag is located below a DIV tag area with a higher z-index value.

According to an embodiment, based on the grouping by the content type of objects included in the page, at least one group generated by the grouping may be determined as the additional content. For example, the content type may include an image type, a video type, and/or a list type of a text. One example of the method of grouping by type may include a method of grouping objects by determining content types of objects included in a page based on a DOM structure of the page. When an external device linked with the electronic device exists, objects corresponding to some groups according to each content type may be determined as the additional content to be displayed in any one of the divided regions of the screen by a display of the external device.

Further, for example, when the electronic device is linked with an external device including an auxiliary display, such as AR glasses, a smartwatch, or a monitor, a region of a screen utilized on the electronic device may be added. In order to display a content related to the original page of the loaded app in the region of the added screen, at least one or more groups according to the content type may be determined as the additional content. For example, in a case of the AR glasses, each of left, right, upper, lower, or rear side of a virtual space viewed through the AR glasses may correspond to a divided region of a screen, and therefore, a plurality of groups according to the content type may be determined as the additional content to be displayed in the divided region.

According to an embodiment, when a content related to the original page of the loaded app as well as the object included in the original page of the loaded app may be extracted or generated separately, the related content may be determined as the additional content.

For example, when a page of a news website is loaded, an object linked to news having a different source may be generated and determined as the additional content. In another example, when a page of a shopping website is loaded, items sold on a page of another shopping website may be generated as a list and determined as the additional content. In another example, based on a history of visited websites stored in a web browser app, a list of URLs of the visited websites associated with a currently loaded original webpage may be determined as the additional content.

According to an embodiment, the additional content may be determined for each content type of objects included in the original page of the loaded app. For example, when an object corresponding to a media content is included, a media controller having functions for controlling playback of media, such as "pause", "next", "previous", "volume control", or "full screen", may be determined as the additional content in response to the object. In another example, in a case of a game application, an input controller, such as arrow keys and a function key, may be determined as the additional content.

Referring back to FIG. 3, the content reorganization and display manager 330 according to an embodiment may determine an output method of the determined additional content through the extra space. The content reorganization and display manager 330 may determine the output method, based on determining whether the extra space is sufficient to display the additional content. The determination of whether the extra space is sufficient to display the additional content may be performed based on at least one of a size of the extra space and a size of the additional content. For example, whether the extra space is sufficient to display the additional content may be determined based on whether a width and height of the extra space are greater than or equal to set threshold values. In another example, it may be determined whether the size of the extra space is greater than or equal to a minimum size of the additional content. In still another example, when the additional content is a list including texts, it may be determined whether a set threshold value or more of the number of characters per text line may be shown in the extra space. In still another example, when the additional content is a list including a plurality of images, it may be determined whether the width of the extra space is greater than or equal to a width of one image.

According to an embodiment, based on the size of the determined additional content and the size of the extra space, the arrangement of the objects included in the additional content may be determined. For example, when the additional content is a list including a specific type of objects, the additional content may be arranged to be sequentially displayed in the unit of objects in the extra space. According to an embodiment, the objects included in the additional content may be arranged using a carousel type UI, in addition to a simple list type UI.

According to an embodiment, the order of arrangement of each object may be determined based on a priority of each object. For example, the priority of each object may be determined based on past data corresponding to the original page of the loaded app. For example, the objects included in the additional content may be displayed in the order of the highest click count in the extra space or may be displayed in the order of the most recently clicked object. For example, when the additional content is a list of objects including hyperlinks of news articles, an object corresponding to a news article clicked many times by the user may be preferentially displayed in the extra space, or an object corresponding to a news article clicked recently by the user may be preferentially displayed in the extra space.

According to an embodiment, the object included in the additional content may be updated in response to an input of a user's selection. For example, when any one object in the additional content is selected by the user, at least some of the objects included in the additional content may be updated to and displayed as other objects. Also, for example, when any one object in the additional content is selected by the user, the additional content may be updated to an object related to the selected object.

Figure 9:
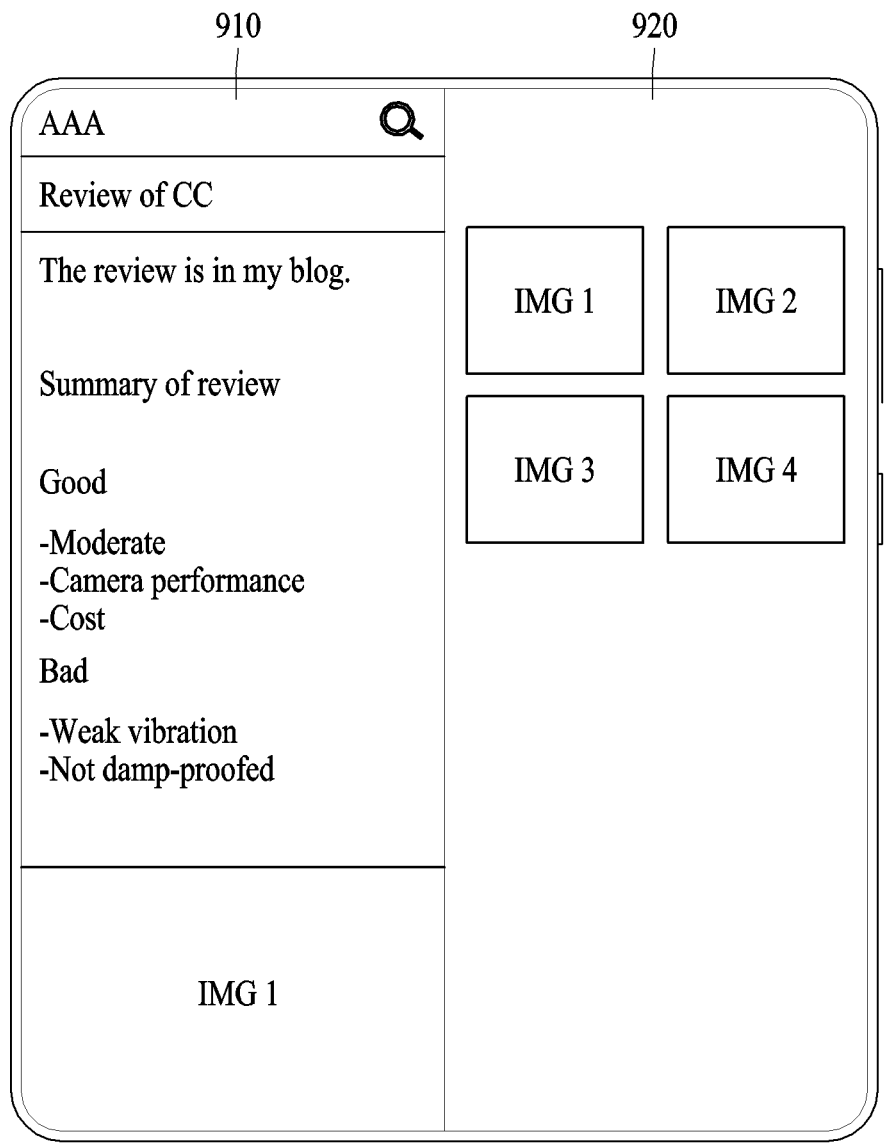
FIG. 9 is a diagram illustrating a method of displaying an additional content in an extra space according to an embodiment.
Figure 10:
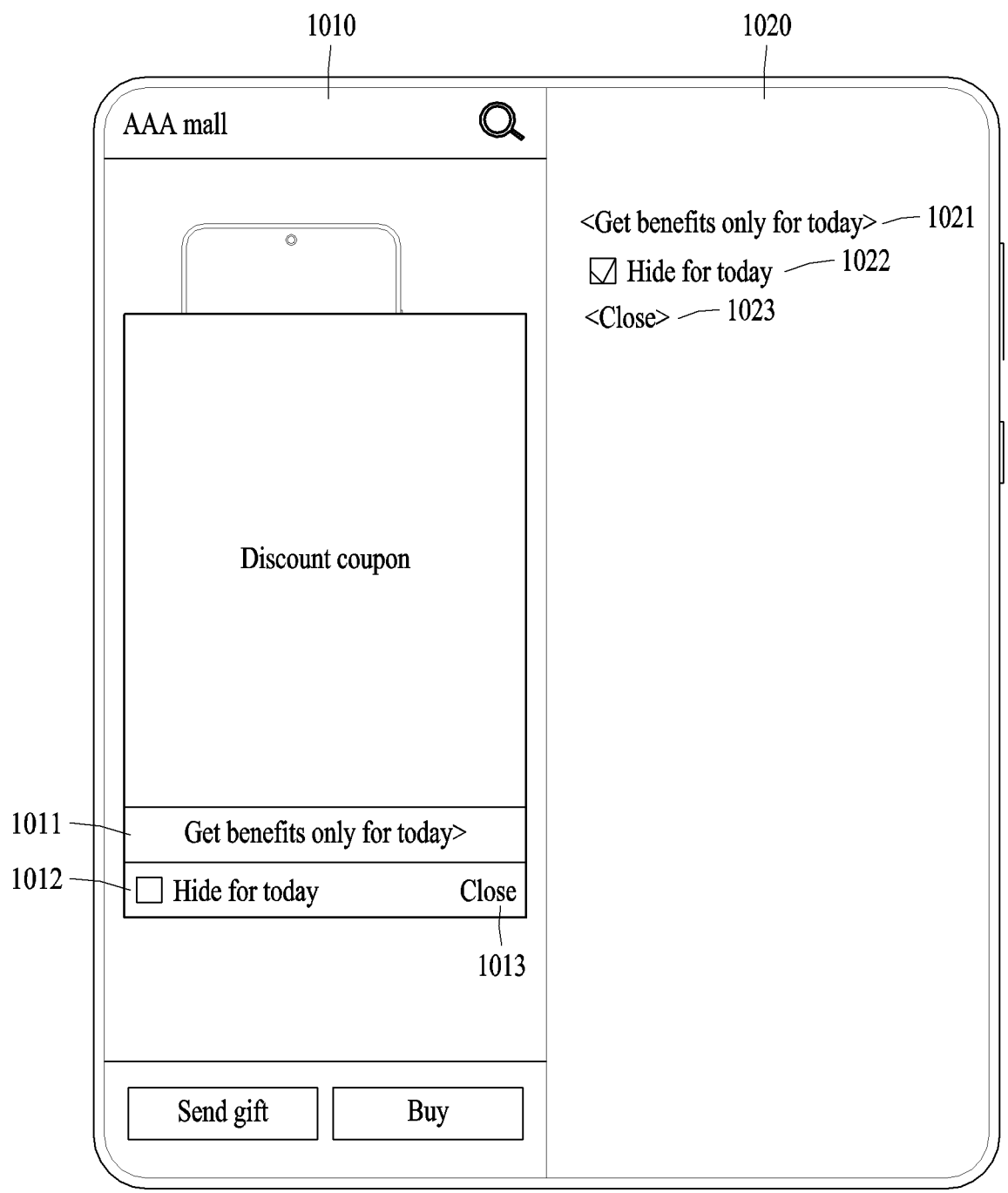
FIG. 10 is a diagram illustrating a method of displaying an additional content in an extra space according to an embodiment.

According to an embodiment, the output method of the additional content through the extra space may include a method of displaying, in the extra space, an object determined as the additional content in the original page of the loaded app, by cloning the object. For example, the additional content displayed in the extra space may be a clone of an object displayed in the main space. For example, referring to FIG. 9, an additional content output through an extra space 920 may include images obtained by cloning images included within the page displayed in the main space 910. In addition, for example, referring to FIG. 10, an additional content output through an extra space 1020 may include interfacing objects 1021, 1022, and 1023 which are cloned from the interfacing objects 1011, 1012, and 1013 displayed in the main space 1010, and selectable to cause respectively the same operations. For example, when a selection of the interfacing object 1022 in the extra space 1020 is detected, a pop-up window may be closed and the pop-up window may be set so as not to pop up for one day, just as the interfacing object 1012 displayed in the main space 1010 were selected.

According to an embodiment, the space manager 300 may further include an action manager 340. The action manager 340 may add an action corresponding to a received input to the additional content. The action may include a response to the received input, and may include an operation defined as being performed on the additional content in response to the received input. For example, the additional content may be cloned so as to be the same as the object on which it is based, or may be output in a modified form, such as one to which a specific action is added.

Figure 11:
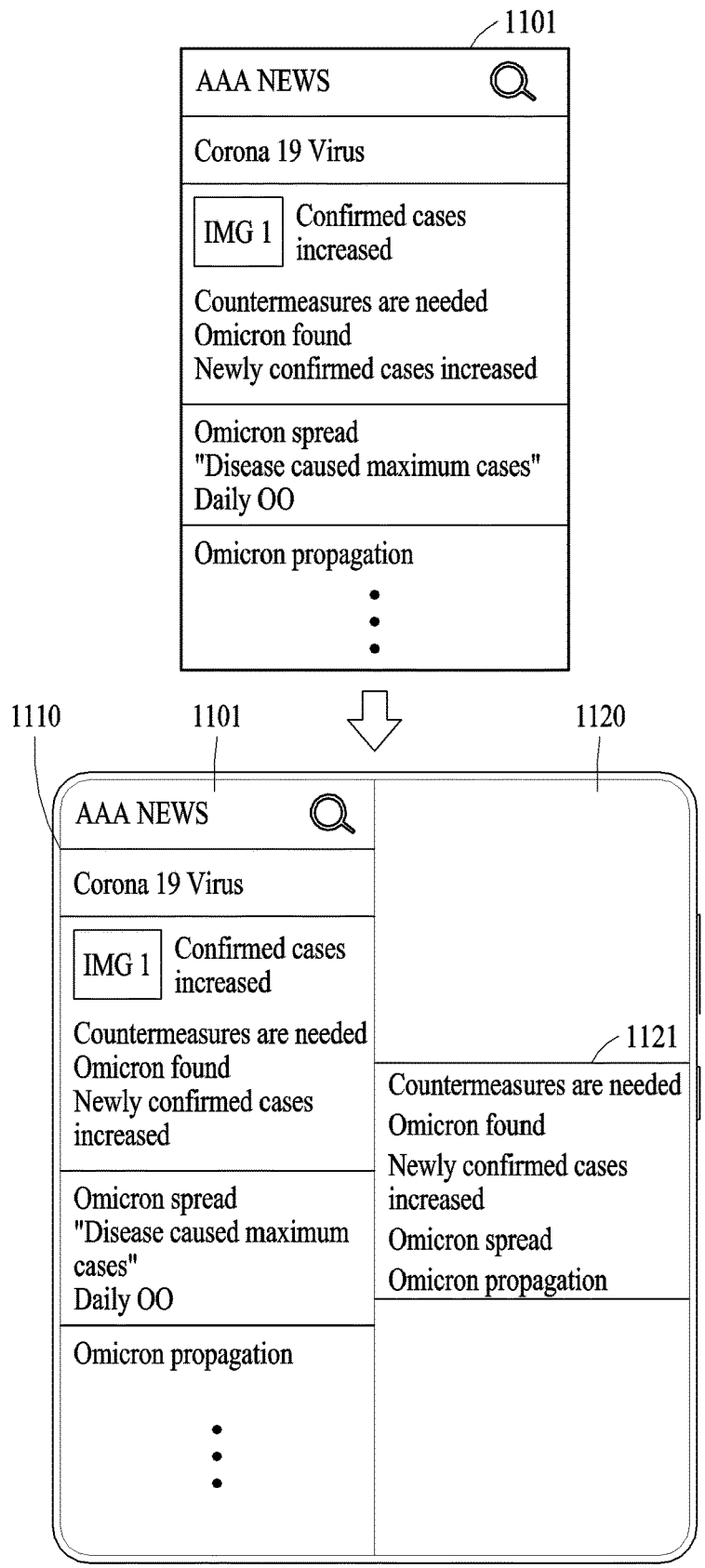
FIGS. 11, 12, 13, 14 and 16 are diagrams illustrating additional contents, to which specific actions are added, according to an embodiment.

In an example, the action may include outputting a content linked through an anchor link to the additional content through a specific space in an adjusted layout. For example, referring to FIG. 11, a screen 1101 output through the display of the electronic device may be divided into a main space 1110 and an extra space 1120 by layout adjustment. The original page of the loaded app may be displayed in the main space 1110 of the divided screen, and an additional content including a hyperlink 1121 related to a news article may be displayed in the extra space 1120 of the divided screen. When an input of a user's selection for the hyperlink 1121 is received, an action of outputting, through the main space 1110, the content of the news article linked through the hyperlink 1121 may be added to the hyperlink 1121 related to the news article included in the additional content.

In an example, the action may be defined based on a content type of an object included in the additional content. The content type of the object included in the additional content may include an image, video, text, and/or game type.

Figure 12:
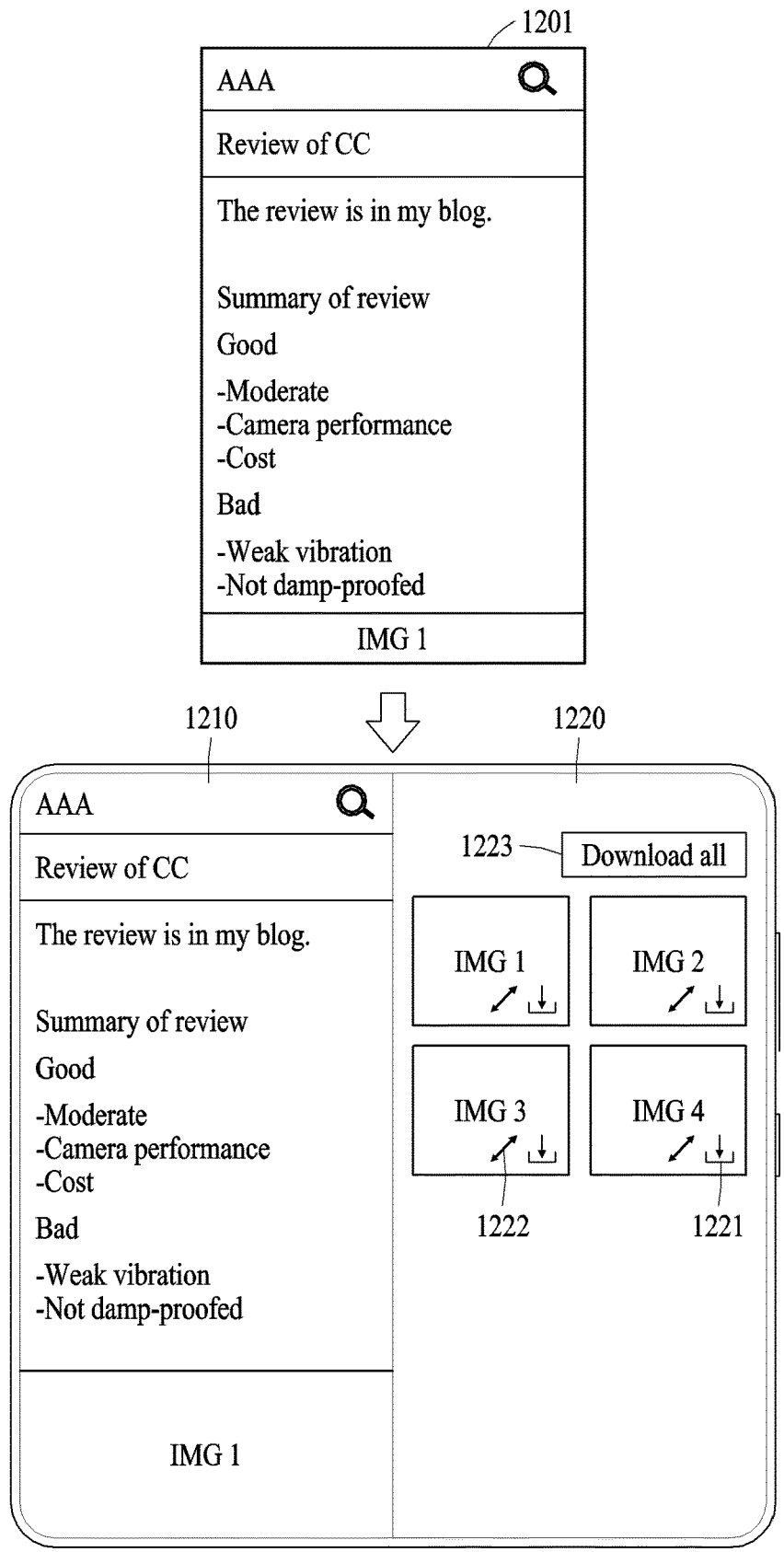

For example, referring to FIG. 12, a screen 1201 output through the display of the electronic device may be divided into a main space 1210 and an extra space 1220 according to a layout adjustment. An original page of a loaded app may be displayed in the main space 1210 of the divided screen, and additional content including images included in the original page of the loaded app may be displayed in the extra space 1220 of the divided screen. Based upon the image type, an action may be added to the image objects included in the additional content. For example, the added action may include downloading one or all of the images, and/or viewing the image in full screen. The action may be added so as to be included in the additional content. The action added to the additional content may be implemented through an interfacing object. For example, the additional content may include an interfacing object 1221, which is selectable to trigger a download action. The additional content may include an interfacing object 1222, which is selectable to trigger a full screen view of the corresponding image, and lastly an interfacing object 1223, which is selectable to trigger download of all images included in the extra space as additional content.

Figure 13:
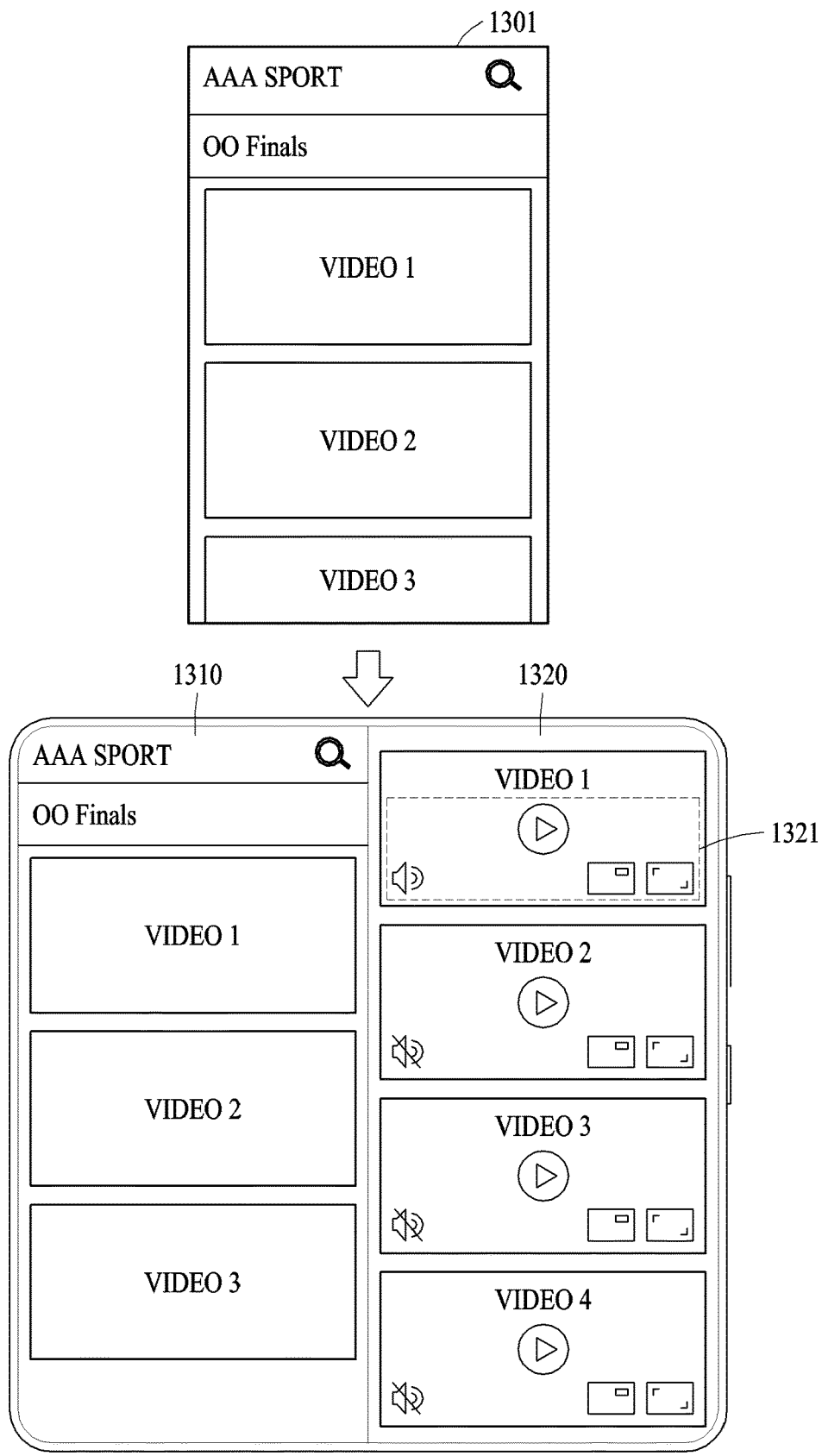

For example, referring to FIG. 13, a screen 1301 that is output through the display of the electronic device may be divided into a main space 1310 and an extra space 1320, upon execution of layout adjustment when, for example, a device is unfolded. The original page of a loaded app previously displayed in the folded state, may be displayed in the main space 1310 of the divided screen when the device is unfolded. Additional content including videos included in the original page of the loaded app may be displayed in the extra space 1320 of the divided screen. Based on the video type, an action for controlling playback of a video or an action for controlling a size of a playback screen may be added to a video object included in the additional content as interfacing objects. The action added to the additional content may be implemented through an interfacing object 1321 corresponding to a video media controller.

Figure 14:
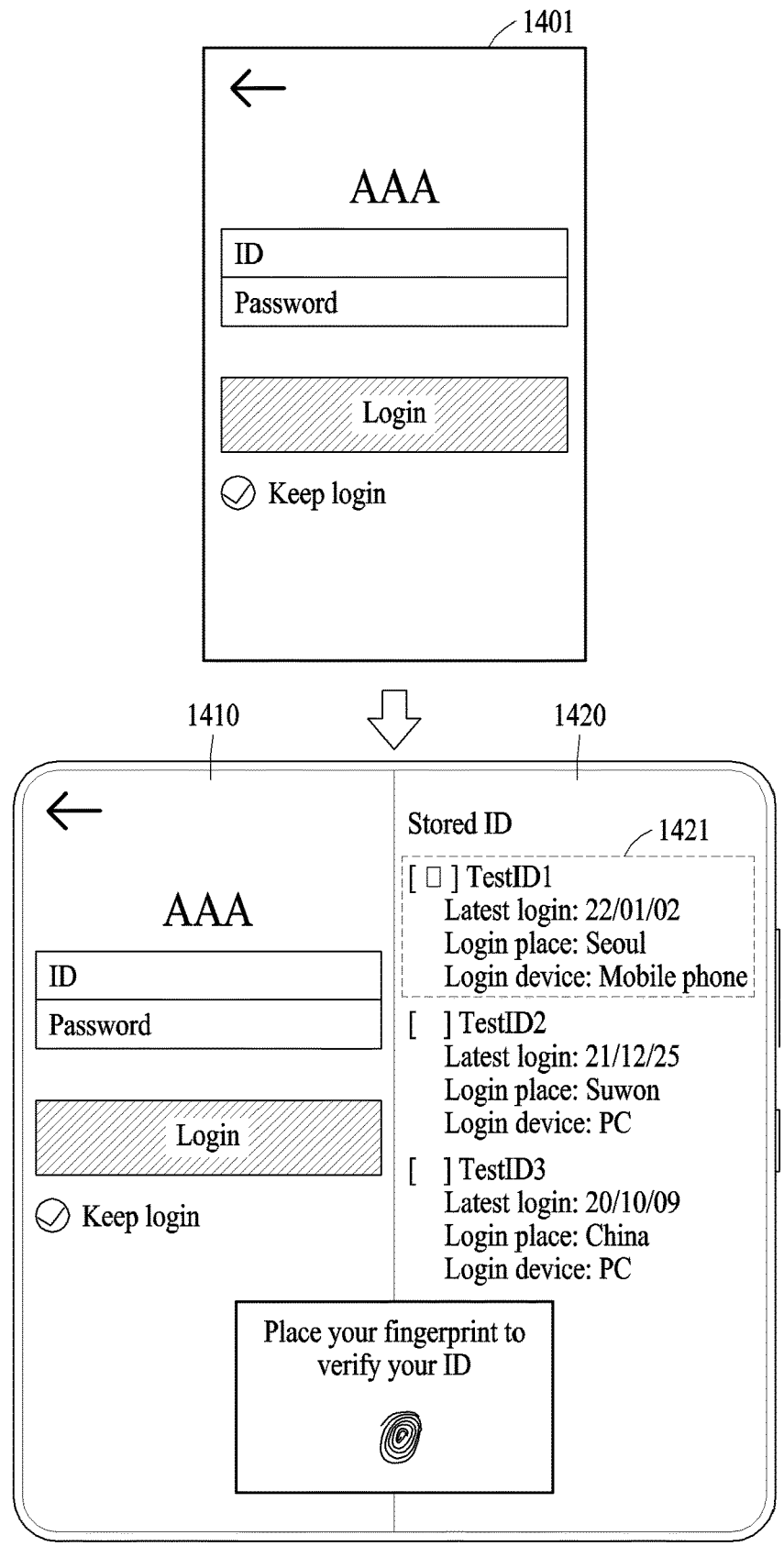

In an example, the action may include at least one of actions of adding additional content selected by a user input to a main space. For example, referring to FIG. 14, a login screen 1401 output through the display of the electronic device when folded, may be divided into a main space 1410 and an extra space 1420 by layout adjustment when the device is unfolded. The original login page may be displayed in the main space 1410 of the divided screen, and additional content may be displayed to the extra space. In this example, the extra space may include login information 1421 according to historical login data. The historical login data may have been stored based on previous logins executed at the original page of the loaded app. Furthermore, each listed historical login data may be selectable to execute an automatic login. For example, if the user selects the historical login data TestID1 1421, the device may execute an action of automatically performing login by adding the relevant portions of the login information 1421 to the input fields (e.g., ID and Password) displayed in the main space. In another example, when the input of the user's selection for the login information 1421 is received, automatic login may request further user authentication, such as the illustrated fingerprint authentication prompt, prior to filling in the ID and Password fields of the main space.

Figure 15:
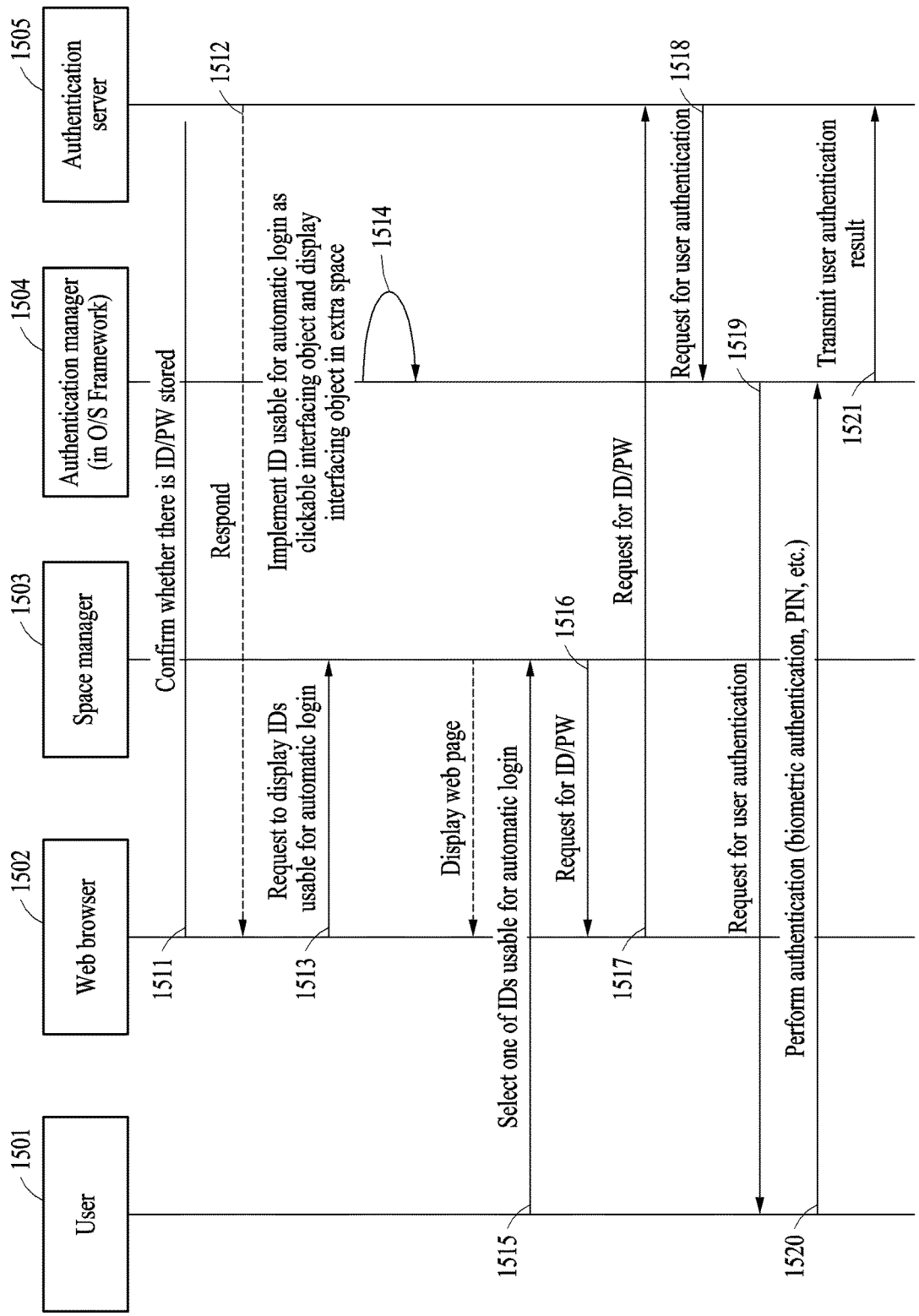
FIG. 15 is a flowchart of a detailed operation of performing automatic login by an action added to an additional content according to an embodiment.

A detailed operation of the automatic login performed by the action added to the additional content according to an embodiment will be described with reference to FIG. 15. Referring to FIG. 15, in operation 1511, a web browser app 1502 may request an authentication server (or authentication cloud) 1505 to confirm whether login information (ID/PW) of a user 1501 is stored in association with a loaded original webpage. In operation 1513, the web browser app 1502, which has received the login information from the authentication server 1505, may request a space manager (e.g., the space manager 300 of FIG. 3) 1503 to display IDs usable for the automatic login. In operation 1514, the space manager 1503 may implement the received IDs usable for the automatic login as a clickable interfacing object and display the interfacing object in the extra space. In operation 1515, the user 1501 may select any one of the IDs usable for the automatic login through the interfacing object displayed in the extra space, and in operation 1516, the space manager 1503, which has received a selection input of the user 1501, may request the web browser app 1502 for login information corresponding to the selected ID usable for the automatic login. In operation 1517, the web browser app 1502 may request the requested login information back to the authentication server 1505, and in operation 1518, the authentication server 1505 may request for user authentication corresponding to the requested login information through an authentication manager 1504 implemented in a framework (e.g., the middleware 144 of FIG. 1 and/or FIG. 2) of the electronic device. In operation 1519, the authentication manager 1504 may request the user 1501 for the user authentication, and in operation 1520, the user 1501 may perform the authentication by inputting authentication information for authenticating that the user is a user corresponding to the stored login information. The authentication may be performed by various authentication methods such as biometric authentication (e.g., authentication through face recognition or authentication through fingerprint recognition) and PIN input. In operation 1521, an authentication result is transmitted to the authentication server 1505, thereby performing the automatic login.

Figure 16:
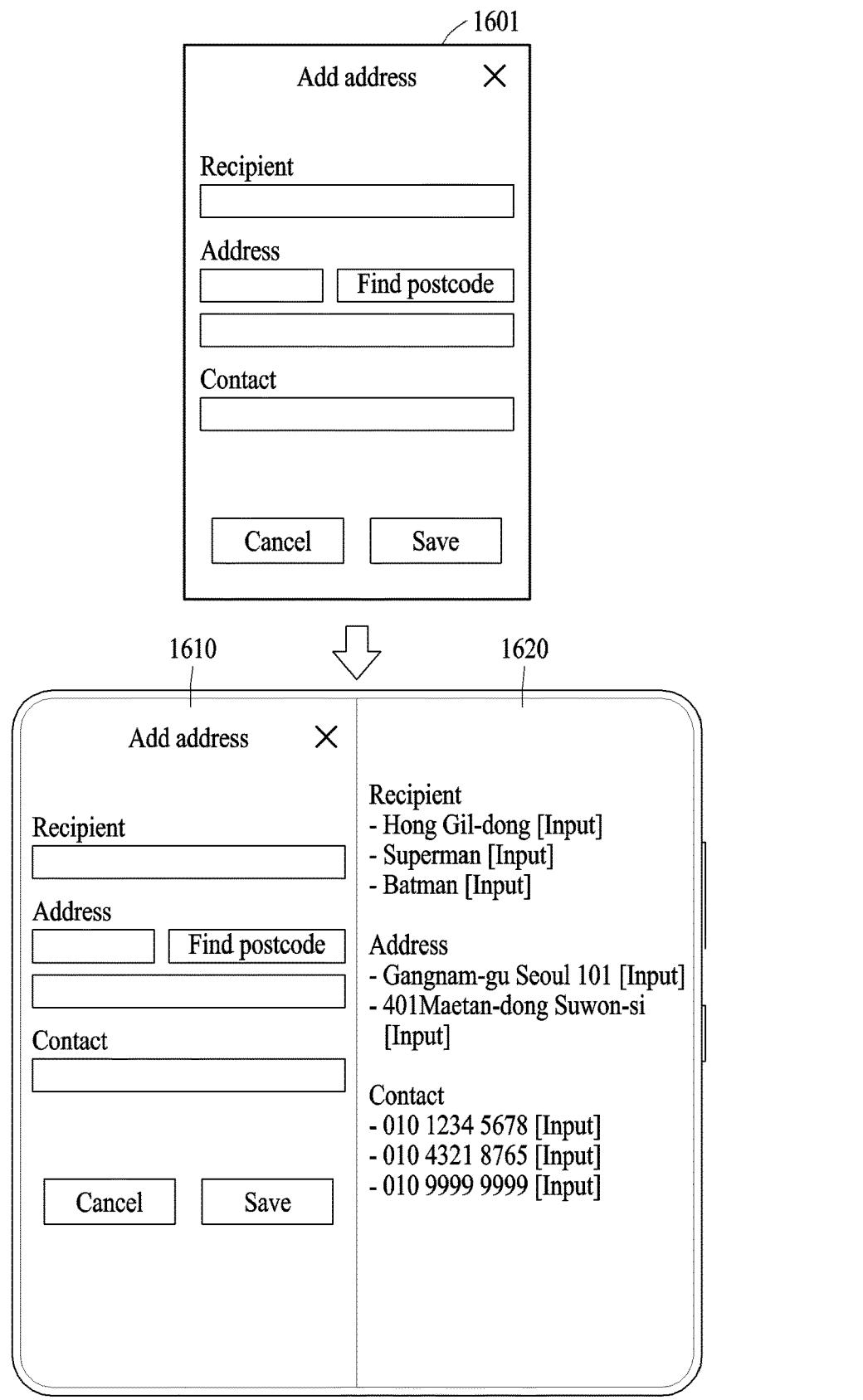

For example, referring to FIG. 16, an address screen 1601 output through the display of the electronic device may be divided into a main space 1610 and an extra space 1620 according to a layout adjustment (e.g., executed based on a change, for example, from a folded to an unfolded configuration). The original page of a loaded app may be displayed in the main space 1610 of the expanded, divided screen, and additional content including order information according to past order information input data stored to correspond to the original page of the loaded app may be displayed in the extra space 1620 of the divided screen. An action of adding the order information to input boxes for input of the order information in the main space by an input of a user's selection may be added to the order information included in the additional content. For example, when the user selects information corresponding to 'recipient', 'address' and/or 'contact' from the extra space, the selected order information may be automatically added to the input boxes in the original page of the loaded app, as displayed in the main space.

According to an embodiment, the space manager 300 may further include a multi-display/multi-electronic device manager 350. The multi-display/multi-electronic device manager 350 according to an embodiment may manage information on a plurality of displays based on the form factor of the electronic device 101 and/or another external device (e.g., the electronic device 102 or electronic device 104 of FIG. 1) linked with the electronic device 101 and a display of the external devices.

The structure of the space manager 300 shown in FIG. 3 is merely an example of a logical structure of operations implemented in the space manager 300, and does not limit the structure of the space manager 300, and the space manager 300 may include a program in which at least one operation and/or function regarding a screen display method executed by the processor 120 of the electronic device 101 is implemented.

An electronic device 101 according to an embodiment may include at least one processor 120 configured to execute a space manager 300 and the processor 120 may determine whether to adjust a layout of a screen for outputting the page, based on a display specification of the electronic device, determine an additional content to be displayed in an extra space generated based on the layout adjustment of the screen, and determine an output method of the determined additional content through the extra space.

In the determining of whether to adjust the layout of the screen, the processor 120 may perform at least one of determining whether to adjust the layout of the screen based on a ratio of a height to a width of the screen, determining whether to adjust the layout of the screen based on the number of divided regions of the screen, or determining whether to adjust the layout of the screen based on whether the electronic device is linked with a device including a screen for outputting the page.

In the determining of the content to be displayed in the extra space, the processor 120 may perform at least one of extracting objects on the same level in the page based on a DOM structure of the page and determining the objects as the additional content, or extracting an interfacing object operating based on a user interaction in the page and determining the interfacing object as the additional content.

In the determining of the content to be displayed in the extra space, the processor 120 may perform at least one of determining whether the page displayed on the screen is lost, or determining a lost portion of the page as the additional content based on the determination of whether the page is lost.

In the determining of the output method through the extra space, the processor 120 may add an action related to a response to a received input to the additional content.

Figure 17:
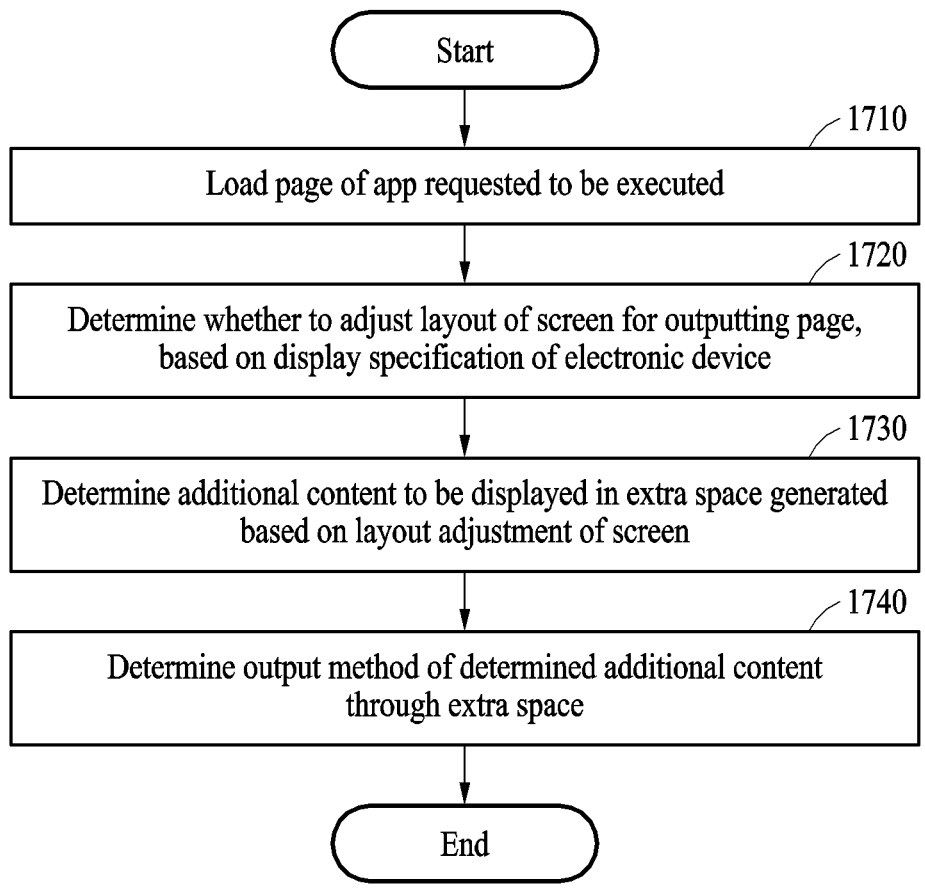
FIG. 17 is a flowchart illustrating a screen display method of an electronic device according to an embodiment.

FIG. 17 is a flowchart illustrating a method of displaying a screen of an electronic device according to an embodiment.

In an example, the operation(s) of a screen display method of an electronic device (e.g., the electronic device 101 of FIG. 1) shown in FIG. 17 may be executed by at least one processor (e.g., the processor 120 of FIG. 1) of the electronic device. In an example, the operation(s) of the screen display method of the electronic device shown in FIG. 17 may correspond to operation(s) implemented in a space manager (e.g., the space manager 300 of FIG. 3) executed by the processor of the electronic device.

Referring to FIG. 17, a screen display method of an electronic device, the method may include operation 1710 of loading a page of an app (e.g., the application 146 of FIG. 1 or the application 146 of FIG. 2) for which the user requested execution, operation 1720 of determining whether to adjust a layout of a screen for outputting the page, based on a display specification of the electronic device, operation 1730 of determining an additional content to be displayed in an extra space generated based on the adjusted layout of the screen, and operation 1740 of determining an output method for the determined additional content through the extra space.

Operation 1720 of determining whether to adjust the layout of the screen may be based on a ratio of a height to a width of the screen, or based on the number of divided regions of the screen.

The display specification may be determined based on at least one of whether the electronic device is linked with a device including a screen for outputting the page or a state of a screen according to a structure of a form factor of the electronic device.

Operation 1720 of determining whether to adjust the layout of the screen may further include dividing the screen into a main space and an extra space in response to the determination to adjust the layout of the screen, and arranging the page previously loaded in operation 1710 for display in the main space.

Operation 1730 of determining the additional content to be displayed in an extra space may include extracting objects on the same level in the page based on a DOM structure of the page, and displaying the extracted objects as the additional content.

Operation 1730 of determining the additional content to be displayed in an extra space may include extracting an interfacing object operating based on a user interaction in the page, and displaying the extracted interfacing object as the additional content, which may be selectable from the extra space.

Operation 1730 of determining the additional content to be displayed in an extra space may include determining whether the page displayed on the screen is lost, and setting a lost portion, lost object or lost interface of the page as the additional content based on the determination of whether the page is lost, allowing it to be displayed and selectable from the extra space.

Operation 1730 of determining the additional content to be displayed in the extra space may include grouping objects included in the page by content type based on the DOM structure of the page, and determining at least one group generated by the grouping as the additional content.

Operation 1740 of determining the output method of the determined additional content through the extra space may include outputting, through the extra space, an object corresponding to the additional content in the page displayed in a main space by cloning the object.

Operation 1740 of determining the output method of the determined additional content through the extra space may include determining whether the determined additional content is able to be output through the extra space, based on a size of the determined additional content and a size of the extra space.

Operation 1740 of determining the output method of the determined additional content through the extra space may include determining arrangement of objects included in the additional content, based on a size of the determined additional content and a size of the extra space.

The determining of the arrangement of the objects may include determining a priority of the objects based on past data corresponding to the page, and determining the arrangement of the objects based on the priority.

Operation 1740 of determining of the output method of the determined additional content through the extra space may include adding an action corresponding to a received input to the additional content.

The action may include at least one of an action of outputting a content linked to the additional content via an anchor link through a specific space in the adjusted layout, an action defined based on a content type of an object included in the additional content, or an action of adding additional content selected by a user input to a main space.

The electronic device according to certain embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that certain embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "$1^{st}$," "$2^{nd}$," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
    a memory, storing programming instructions; and
    at least one processor,
    wherein the programming instructions are executable by the at least one processor to cause the electronic device to:
        upon detecting a request to execute an application, load a page of the application;
        based on a display specification of the electronic device, determine whether to adjust a layout of a screen including output of the loaded page;
        upon adjusting the layout of the screen, determine an additional content to be displayed in an extra space included in the adjusted layout of the screen; and
        determine an output method by which the determined additional content is displayed in the extra space,
        wherein determining the additional content to be displayed in the extra space comprises:
        identifying levels and content types of objects included in the page, based on a document object model (DOM) structure of the page; and
        determining the objects identified as having a same level and a same content type as the additional content.

2. The electronic device of claim 1, wherein determining of whether to adjust the layout of the screen is based on at least one of:
    a ratio of a height to a width of the screen;
    a number of divided regions of the screen; or
    whether the electronic device is communicatively coupled with an external device including a display for outputting the page.

3. The electronic device of claim 1, wherein identifying the levels and the content types of the objects comprises:
    identifying the levels, the content types and sizes of objects included in the page, based on a document object model (DOM) structure of the page,
    wherein determining the objects identified as having the same level and the same content type as the additional content comprises:
    determining the objects identified as having the same level, the same content type and a same size as the additional content.

4. The electronic device of claim 1, wherein determining the additional content to be displayed in the extra space further comprises:
    extracting an interface object included in the page that is operative based on a user interaction, wherein the additional content includes the interface object.

5. The electronic device of claim 1, wherein determining the output method by which the determined additional content is displayed in the extra space comprises:
    adding an action that is related to a response to a received input to the additional content,
    wherein the action includes at least one of:
    outputting a content linked to the additional content via an anchor link disposed at a prespecified space within the adjusted layout: or
    a function defined based on a content type of an object included in the additional content.

6. A display method of an electronic device, the method comprising:
    upon detecting a request to execute an application, loading, via at least one processor, a page of the requested application;
    based on a display specification of the electronic device, determining, via the at least one processor, whether to adjust a layout of a screen for outputting the page;
    upon adjusting the layout of the screen, determining, via the at least one processor, an additional content to be displayed in an extra space included in the adjusted layout of the screen; and
    determining, via the at least one processor, an output method by which the determined additional content is displayed in the extra space,
    wherein determining the additional content to be displayed in an extra space further comprises:
    identifying levels and content types of objects included in the page, based on a document object model (DOM) structure of the page; and
    determining the objects identified as having a same level and a same content type as the additional content.

7. The method of claim 6, wherein determining of whether to adjust the layout of the screen is based on at least one of:
    a ratio of a height to a width of the screen; or
    a number of divided regions of the screen.

8. The method of claim 6, wherein the display specification is based on at least one of:
    whether the electronic device is communicatively coupled with an external device including a display for outputting the page, or
    a state of the screen as defined according to a form factor of the electronic device.

9. The method of claim 6, wherein determining whether to adjust the layout of the screen further comprises:
    dividing the screen into a main space and an extra space, in response to the determination to adjust the layout of the screen; and
    arranging the loaded page in the main space and excluding the loaded page from the extra space.

10. The method of claim 6, wherein determining the additional content to be displayed in the extra space further comprises:
    extracting an interface object included in the page that is operative based on a user interaction, wherein the additional content includes the interface object.

11. The method of claim 6, wherein determining the additional content to be displayed in the extra space further comprises:

determining whether the page displayed on the screen is lost; and determining that a lost portion of the page is the additional content, based determining that the page is lost.

12. The method of claim 6, wherein identifying the levels and the content types of the objects comprises:

identifying the levels, the content types and sizes of the objects included in the page, based on a document object model (DOM) structure of the page, wherein determining the objects identified as having the same level and the same content type as the additional content comprises:

determining the objects identified as having the same level, the same content type and a same size as the additional content.

13. The method of claim 6, wherein determining the additional content to be displayed in the extra space further comprises:

determining login information extracted from historical login data stored based on previous logins executed at the page as the additional content, wherein the login information is displayed in the extra space as a selectable object, and upon receiving a user selection input for the selectable object, the login information is entered into login input fields of the page displayed in a main space.

14. The method of claim 6, wherein determining the output method by which the determined additional content is displayed in the extra space further comprises:

determining whether the determined additional content is able to be output through the extra space, based on respective sizes of the determined additional content and the extra space.

15. The method of claim 6, wherein determining the output method by which the determined additional content is displayed in the extra space further comprises:

determining a display arrangement of objects included in the additional content, based on respective sizes of the determined additional content and the extra space.

16. The method of claim 15 further comprising:

determining respective priorities of each of the objects based on historical data associated with the page, wherein the display arrangement of the objects is based on the respective priorities.

17. The method of claim 6, wherein determining the output method by which the determined additional content is displayed in the extra space comprises:

adding an action corresponding to a received input to the additional content, wherein the action includes outputting a content linked to the additional content via an anchor link disposed at a prespecified space within the adjusted layout.

18. The method of claim 6, wherein determining the output method by which the determined additional content is displayed in the extra space comprises:

adding an action corresponding to a received input to the additional content, wherein the action includes a function defined based on a content type of an object included in the additional content.

19. A non-transitory computer-readable storage medium storing instructions that, are executable by a processor, to cause an electronic device to:

upon detecting a request to execute an application, loading, via at least one processor, a page of the requested application;

based on a display specification of the electronic device, determining, via the at least one processor, whether to adjust a layout of a screen for outputting the page;

upon adjusting the layout of the screen, determining, via the at least one processor, an additional content to be displayed in an extra space included in the adjusted layout of the screen; and determining, via the at least one processor, an output method by which the determined additional content is displayed in the extra space, wherein determining the additional content to be displayed in the extra space comprises:

identifying levels and content types of objects included in the page, based on a document object model (DOM) structure of the page; and determine the objects identified as having a same level and a same content type as the additional content.

* * * * *